(12) United States Patent
Smith et al.

(10) Patent No.: US 6,715,058 B1
(45) Date of Patent: Mar. 30, 2004

(54) APPARATUS AND METHOD FOR A SORTING MODE IN A DIRECT MEMORY ACCESS CONTROLLER OF A DIGITAL SIGNAL PROCESSOR

(75) Inventors: Patrick J. Smith, Houston, TX (US); Tai H. Nguyen, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/670,667

(22) Filed: Sep. 27, 2000

Related U.S. Application Data

(60) Provisional application No. 60/156,626, filed on Sep. 28, 1999.

(51) Int. Cl.[7] .............................................. G06F 12/02
(52) U.S. Cl. ...................... 711/220; 711/217; 710/26; 710/30
(58) Field of Search ............................. 711/211, 217, 711/218, 219, 220; 710/30, 22, 26

(56) References Cited

U.S. PATENT DOCUMENTS

| | | | | |
|---|---|---|---|---|
| 4,694,407 A | * | 9/1987 | Ogden | 345/441 |
| 4,920,504 A | * | 4/1990 | Sawada et al. | 345/573 |
| 5,379,277 A | * | 1/1995 | Yamashita et al. | 370/14 |
| 5,754,129 A | * | 5/1998 | Hoshino | 341/100 |
| 5,764,649 A | * | 6/1998 | Tong | 371/21 |
| 5,956,757 A | * | 9/1999 | Sun | 711/211 |
| 5,959,977 A | * | 9/1999 | Park | 370/263 |
| 6,327,259 B1 | * | 12/2001 | Chin et al. | 370/375 |
| 2003/0026284 A1 | * | 2/2003 | Fraas et al. | 370/442 |

\* cited by examiner

*Primary Examiner*—Hiep T. Nguyen
(74) *Attorney, Agent, or Firm*—William W. Holloway; W. James Brady; Frederick J. Telecky, Jr.

(57) ABSTRACT

In order to sort signal group elements organized in blocks in a time-division multiplex protocol into frames of related elements, an address unit addresses the first element in each of the element blocks, then the second element in each element block, etc until all of the elements of all of the blocks have been addressed. In this manner, the related elements are sorted into frames of elements. The address unit performs this element sorting using a base address, an element index equal to the number of elements in a block, and a frame index equal to {the number of elements times (the number of frames minus one)} minus one as parameters.

15 Claims, 4 Drawing Sheets

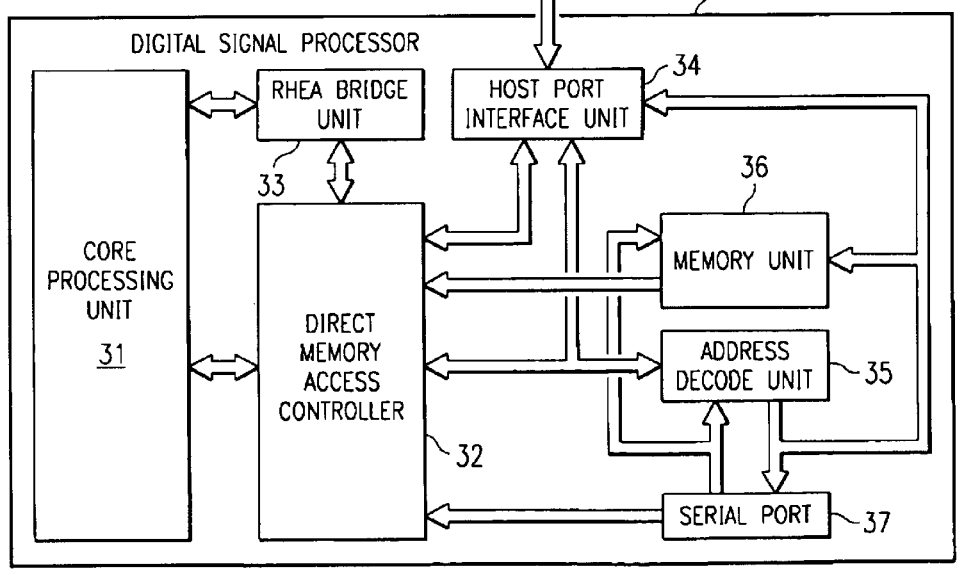

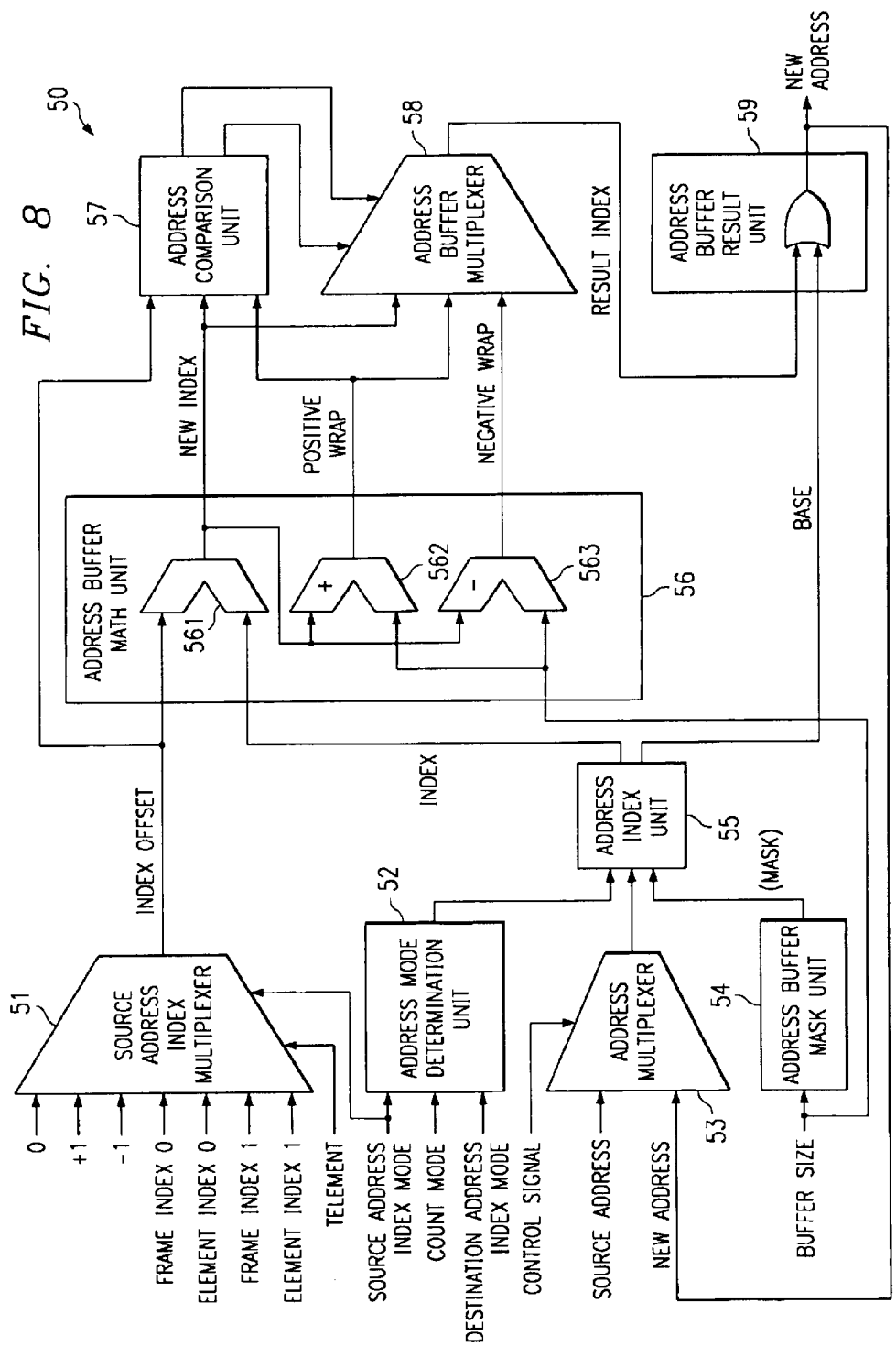

APPARATUS AND METHOD FOR A SORTING MODE IN A DIRECT MEMORY ACCESS CONTROLLER OF A DIGITAL SIGNAL PROCESSOR

This application claims the benefit of U.S. Provisional Application No. 60/156,626, filed Sep. 28, 1999.

RELATED APPLICATIONS

U.S. patent application Ser. No. 09/670,663; APPARATUS AND METHOD FOR THE TRANSFER OF SIGNAL GROUPS BETWEEN DIGITAL SIGNAL PROCESSORS IN A DIGITAL SIGNAL PROCESSING UNIT; invented by Patrick J. Smith, Jason A. Jones and Kevin A. McGonagle; filed on even date herewith; and assigned to the assignee of the present application: U.S. patent application Ser. No. 09/670,664: APPARATUS AND METHOD FOR ACTIVATION OF A DIGITAL SIGNAL PROCESSOR IN AN IDLE MODE FOR INTERPROCESSOR TRANSFER OF SIGNAL GROUPS IN A DIGITAL SIGNAL PROCESSING UNIT; invented by Patrick J. Smith, Jason A. Jones, and Kevin A. McGonagle; filed on even date herewith; and assigned to the assignee of the present application: U.S. patent application Ser. No. 09/670,665; APPARATUS AND METHOD FOR A HOST PROCESSOR INTERFACE UNIT IN A DIGITAL SIGNAL PROCESSING UNIT; invented by Patrick J. Smith, and Jason A. Jones; filed on even date herewith; and assigned to the assignee of the present invention. U.S. patent application Ser. No. 09/670,666; APPARATUS AND METHOD FOR THE EXCHANGE OF SIGNAL GROUPS BETWEEN A PLURALITY COMPONENTS. AND A DIRECT MEMORY ACCESS CONTROLLER IN A DIGITAL SIGNAL PROCESSSOR; invented by Patrick J. Smith, Jason A. Jones, Kevin A. McGonagle, and Tai H. Nguyen; filed on even date herewith; and assigned to the assignee of the present application: and U.S. patent application Ser. No. 09/670,668 now U.S. Pat. No. 6,584,514; APPARATUS AND METHOD FOR ADDRESS MODIFICATION IN A DIRECT MEMORY ACCESS CONTROLLER; invented by Patrick J. Smith; filed on even date herewith; and assigned to the assignee of the present application are related applications.

BACKGROUND OF THE INVENTION

1. Field of the Invention

This invention relates generally to the data processing apparatus and, more particularly, to the specialized high performance processor units generally referred to as digital signal processing units. The invention relates specifically to addressing of the signal groups in the time-division multiplexed format.

2. Background of the Invention

Digital signal processing units have been developed as specialized data processing units. These units are optimized to perform routine, albeit complex, operations with great efficiency. For many applications, the computations need to be done in as close to real time as possible. In order to achieve the computational speed required of the digital signal, the digital signal processing units are optimized to perform the specified processing operation(s) with great efficiency. In addition, many of the functions that would be performed by a general purpose processing unit are eliminated or the functions performed outside of the core processing unit.

Referring to FIG. 1, a digital signal processing unit 1 having two digital signal processors, according to the prior art, is shown. A first digital signal processor 10 includes a core processing unit 12 (frequently referred to as a processing core), a direct memory access unit 14, a memory unit or memory units 16, and a serial port or serial ports 18. The memory unit 16 stores the signal groups that are to be processed or that assist in the processing of the signal groups to be processed by the core processing unit 12. The core processing unit 12 performs the bulk of the processing of signal groups in the memory unit. The direct memory access unit 14 is coupled to the core processing unit 12 and to memory unit 16 and mediates the signal group exchange therebetween. The serial port 18 exchanges signal groups with components external to the digital signal processing unit 1. The core processing unit 12 is coupled to the serial port 18 and to the memory unit 16 and controls the exchange of signal groups between these components.

The digital signal processor is typically designed and implemented to have limited functionality, but functions that must be repeated and performed rapidly. The fast fourier transform calculation and the Viterbi algorithm decoding are two examples where digital signal processors have been utilized with great advantage. To insure that the digital signal processors operate with high efficiency, the core processing is generally optimized for the performance of the limited functionality. Part of the optimization process involves the off-loading, to the extent possible, any processing not directed toward the optimized function. The exchange of signal groups involving the core processing unit and the memory unit has been assigned to the direct memory access unit. The direct memory access unit also controls the exchange of as much as possible the optimization takes the form of off-loading to the extent possible.

More recently, the direct memory access controller has been implemented to control the exchange of data groups between the serial port and the memory unit. This implementation is described in the. U.S. Patent Application entitled APPARATUS AND METHOD FOR THE EXCHANGE OF SIGNAL GROUPS BETWEEN A PLURALITY COMPONENTS AND A DIRECT MEMORY ACCESS CONTROLLER IN A DIGITAL SIGNAL PROCESSSOR, cited above. Referring to FIG. 2, the digital signal processor 10 has a core processing unit 12, a direct memory access controller 24, a memory unit 16, and a serial port 18, the same components as in the prior art digital signal processors shown in FIG. 1. The difference between the embodiments in FIG. 1 and FIG. 2 is as follows. In FIG. 1, the direct memory access controller 14, controls the exchange of signal groups between the memory unit 16, and the core processing unit 12. In FIG. 2, the direct memory access controller 24 controls not only the exchange of signal groups between the memory unit 16, and the core processing unit 12, but also controls the exchange of signal groups between the memory unit 16 and the serial port 18. With this implementation, the core processing unit 12 is relieved of further processing responsibilities, as compared to the implementation shown in FIG. 1. For example, the signal groups applied to the serial port can have a variety of addressing formats. Thus, the core processing unit 12 can be further optimized for specific processing operations without having to provide for these processing functions. The direct memory access controller 24 can be analogized to a plurality of controllable switches. The switches provide controllable channels for the transfer of signals between components. (In the preferred embodiment of the digital signal processors, typically two memory units and two serial ports are present. Consequently, a larger number of channels are provided. In the preferred embodiment, six channels are available in the direct memory access controller 24.)

Transmission of signal groups between a digital signal processing unit and a external component frequently takes the form of a time-division multiplexed series of signal groups. Two examples of time-division multiplexed transmission of signal groups transmission are referred to as a T1 protocol (U.S.) having 24 elements per frame and an E1 protocol (Europe) having 32 elements per frame. Referring to FIG. 3, an illustration of the organization of the E1 protocol is illustrated. As indicated in FIG. 3, the data is transmitted in blocks of signal groups (i.e., four elements per block is shown). The blocks of signal groups have the same number of signal groups as a frame of signal groups, but the organization is different. The first block includes, for example, the elements at the same location from each frame. The first block of elements include, in the U.S. protocol, element 0 from each frame. In other words, the first (0) block of transmitted signals groups is: frame 0, element 0; frame 1, element 0, through frame 23, element 0. The next block (1) of transmitted signal groups includes frame 0, element 1; frame 1, element 1; frame 2, element 1: through frame 23, element 1. The last block (23) of transmitted signal groups is: frame 0, element 23; frame 1, element 23; through frame 23, element 23.

The signal groups transmitted in this manner are not suitable for processing. These signal groups must be sorted into a frame of elements wherein each frame includes related elements in the numerical order and stored in the memory unit 16. In this manner, the signal groups are readily available to the core processing unit 12.

A need has therefore been felt for apparatus and an associated method having a feature that the addresses of the signal groups transmitted with a time-division multiplexed protocol can be modified and sorted into addresses suitable for processing by digital signal processing unit. This sorting address mode would have the further feature that the addresses of the signal groups would be modified and each signal group of a frame would be stored in order. It is a still further feature of the present invention that the sorting mode addressing procedure can be performed rapidly.

SUMMARY OF THE INVENTION

The aforementioned and other features are accomplished, according to the present invention, by providing address apparatus implemented with an efficient sorting mode of operation. In the sorting mode, the elements of a transmitted time-division multiplexed signal are addressed in the first frame order and, within each frame order. The addressing apparatus accomplishes this sorting by addressing the first element in the first block of transmitted elements, then addressing the first element in the second block of transmitted data, then addressing the first element in the third block, and so forth until the first element in each of the blocks has been addressed. In this manner, the elements of the first frame have been addressed in the correct sequential order. Next the second element of the first block of transmitted data is addressed, and subsequently all of the second elements in the sequential frames are addressed. In this manner, the elements of the second frame are sequentially addressed. The procedure is continued until all of the elements in all of blocks have been sequentially addressed, i.e., all the elements have been sorted into frames. The addressing apparatus accomplishes this sorting process with the base address and two parameters. The first parameter is length of each block of elements and is referred to as the element index. The second parameter is the ({number of frames–1) times the number of elements per frame)}–1 and is referred to as the frame index.

BRIEF DESCRIPTION OF THE DRAWINGS

The present invention may be better understood, and its numerous objects, features, and advantages made apparent to those skilled in the art by referencing the accompanying drawings.

FIG. 3 is an illustration of a time-division multiplexed organization for the transmission of information FIG. 4 is a block diagram of a preferred embodiment of a digital signal processor capable of utilizing the present invention.

FIG. 7 illustrates the definition of element index and the frame index according to the present invention.

FIG. 8 is a circuit element diagram of the preferred embodiment of the address unit of direct memory access controller incorporating the present invention.

The use of the same reference symbols in different drawings indicates similar or identical items.

DESCRIPTION OF THE PREFERRED EMBODIMENT

1 Detailed Description of the Figures

Figure 1:
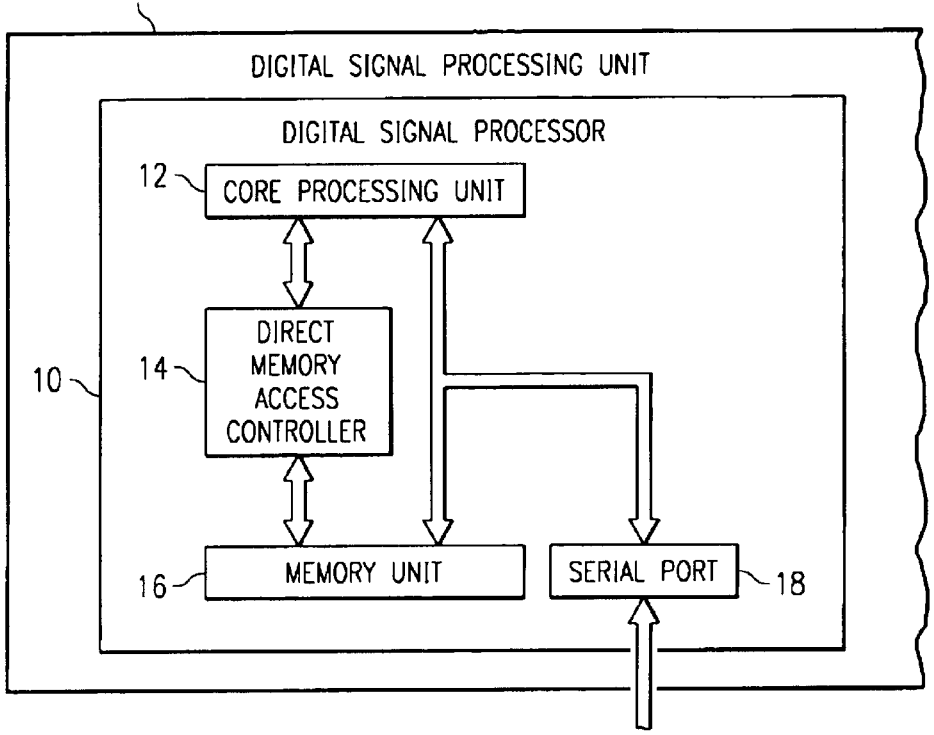
FIG. 1 is a block diagram of a digital signal processing unit having two digital signal processors according to the prior art.
Figure 2:
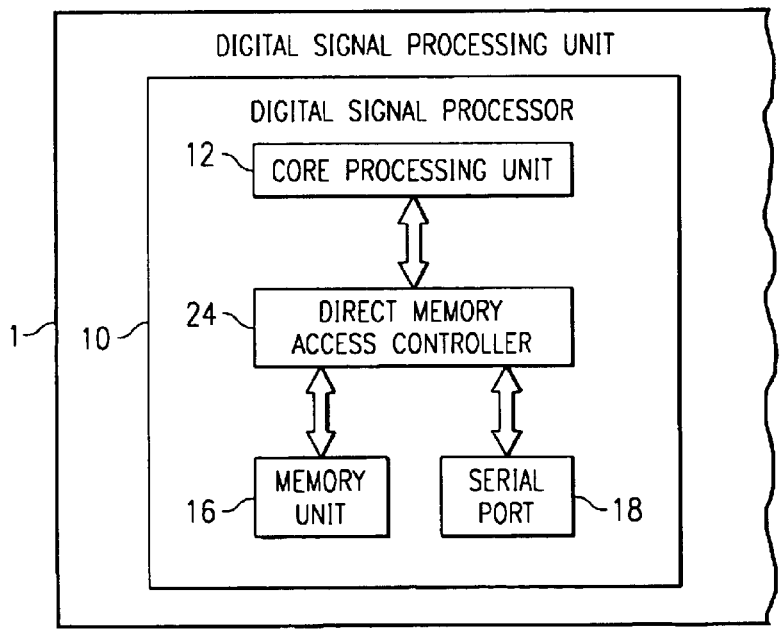
FIG. 2 is a block diagram of a more recent embodiment of a digital signal processing unit.

FIG. 1, FIG. 2, and FIG. 3 has been discussed with respect to the background of the invention.

Referring next to FIG. 4, a block diagram of a digital signal processor 30, according to the preferred embodiment of the invention, is shown. The core processing unit 31 performs the principal processing functions of digital signal processor 30. The core processing unit 31 is generally optimized in both hardware and in software to perform a limited number of processing functions extremely efficiently. The memory unit 36 stores the signal groups that the core processing unit requires for the processing functions. The serial port 37 exchanges signal groups with components outside of the digital signal processing unit. The rhea bridge unit 33 provides an interface between a memory-mapped register bank in the core processing unit 31 and control (context) registers in the direct memory access controller 32. An address decode unit 35 provides an interface with the memory unit 36 and the serial port 37. The host processor interface unit 34 provides an interface to the memory unit 36 and the serial port 37. The direct memory access controller 32 has an interface with the core processing unit 31, the rhea bridge unit 33, host interface unit 34, the address decode unit 35, the memory unit 36 and the serial port 37. In addition, the direct memory access control 32 can receive test signals and interrupt signals. The direct memory access controller 32 performs the functions of controlling the exchange of signal groups between the core processing unit 31 and the memory unit 36. In addition, the direct memory access controller 32 controls the exchange of signal groups between the serial port 37 and the memory unit 36. In controlling these signal group exchanges, the core processing unit 31 is relieved of these processing functions and can therefore perform the functions for which the core processing unit 31 was optimized more efficiently.

Figure 5:
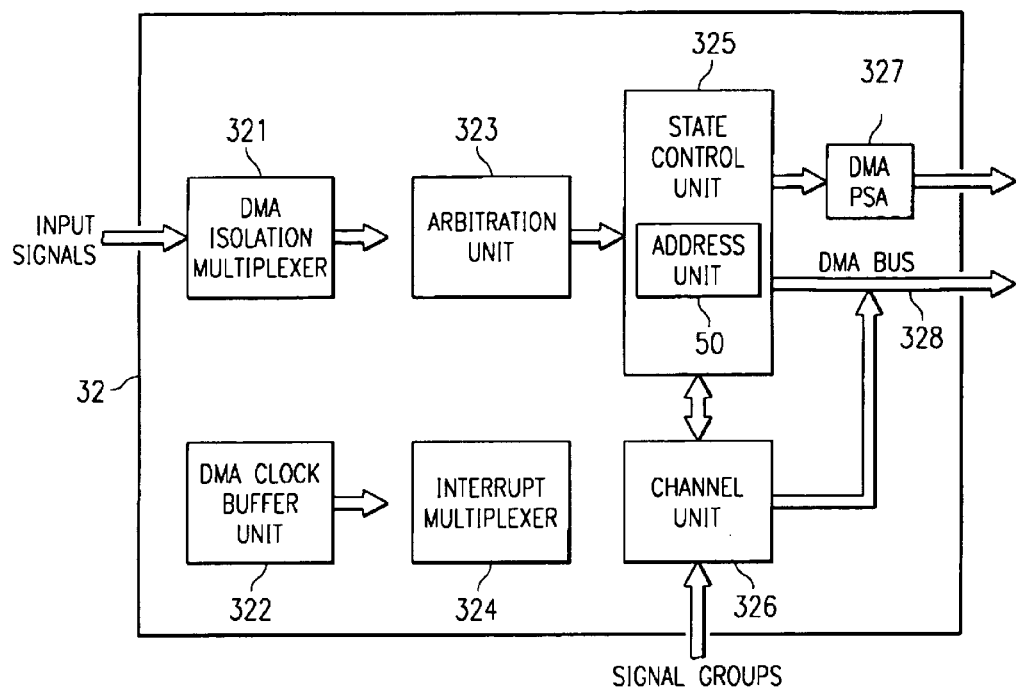
FIG. 5 is a block diagram of a direct memory access controller capable of advantageously using the present invention.

Referring to FIG. 5, a block diagram of the principal components of a direct memory access controller 32, according to the preferred embodiment of the present invention, is shown. The direct memory access controller includes dma isolation multiplexer 321, a clock buffer unit 322, an arbitration unit 323, an interrupt multiplex unit 324, a state control unit 325, a channel unit 326, a PSA unit 326 and a dma bus 328. The dma isolation multiplexer 321 includes the logic components to isolate the input signals to the direct memory access controller 32 for testing. The clock buffer unit 322 contains logic to correct for the skew of the external (i.e. to the digital signal processor) clock signal. The clock signal is then distributed throughout the direct memory access unit 32. The interrupt multiplexer unit 324 provides synchronous interrupts to the core processing unit of the digital signal processor. The arbitration logic 323 includes apparatus responsive to bids for control of one of the channels to select a user of the channel unit 326 and the dma bus 328. The PSA unit 326 is a calculator for testing and for debugging the direct memory access controller 32. The state control unit 325 selects the state (configuration) of the direct memory access controller and applies the control signals that implement the machine configuration. The state control unit 325 includes address unit 50 that will be discussed below. The dma bus 328 includes the signal groups, control signal groups and address signal groups determined by the state control unit 325.

Figure 6:
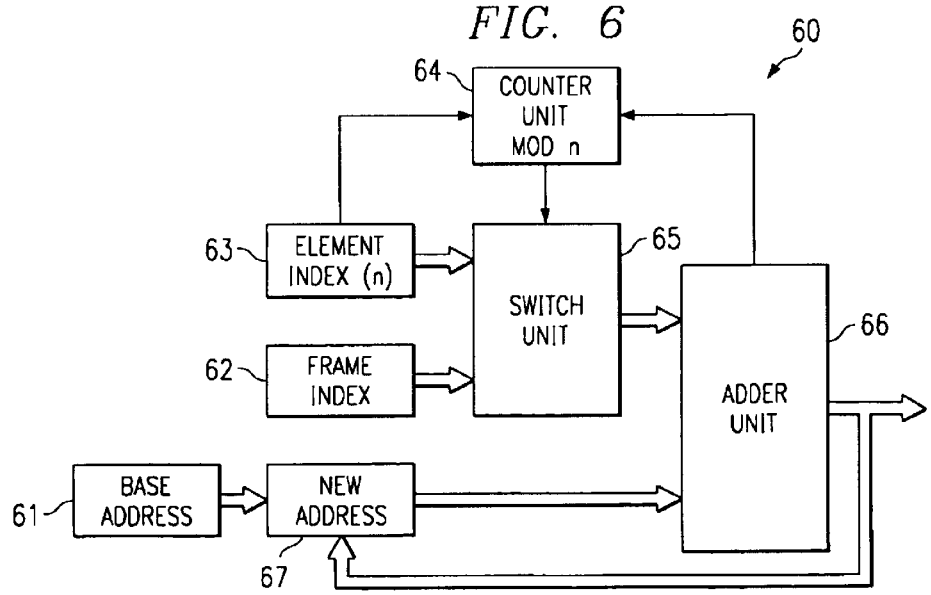
FIG. 6 is a block diagram for reconstructing or sorting the signal groups transmitted in a time-division multiplexed protocol in a digital signal processing unit according to the present invention.

Referring to FIG. 6, the addressing apparatus 60 for reconstructing or sorting incoming time-division multiplexed data into frames or blocks of data that are more efficient for access by a direct memory controller 34 is shown. Referring to FIG. 7, FIG. 3 is reproduced with the terms frame index and element index is shown. The frame index and the element index are parameters used in the addressing apparatus of FIG. 6. The element index is the number of elements in a block of transmitted element, but the element index is also the number of the elements from an element number in one block to the same element number in the succeeding block. The frame index is the number of elements from an element n in the last block of elements to element n−1 in the first block of elements. The element index n is stored in element index register 63, while the frame index is stored in frame index register 62. As will be clear, the frame index signal group has the opposite sign to the element index signal group. A new address is stored in new address register 67, while the base address is stored in the base address register 61. The contents of the frame index register 62 and the element index register 63 are applied to switch unit 65. A counter unit 64 applies a control signal to the switch unit 65. The counter unit 64 is updated each time that a new address is generated by adder unit 66. The counter unit 64 generates a count modulo n, i.e., modulo the index number. Based on the control signal from counter unit 64, the switch unit applies either the frame index signal group or the element index signal group to a first input terminal of adder unit 66. A second input terminal of adder unit 66 receives the new address signal group form new address register 67. The output terminal of the adder unit 66 provides the updated or new address, and this new address replaces the signal group in the new address register 67.

Referring to FIG. 8, the apparatus illustrated in FIG. 6 is incorporated in the preferred embodiment of the addressing apparatus for the direct memory access controller 32. In FIG. 8, a block diagram of the address modification apparatus 50, according to the present invention, is shown. Source address index multiplexer 51 has applied to input terminals thereof a 0 logic signal, a +1 logic signal, a −1 logic signal, a frame index 0 signal group, an element index 0 signal group, a frame index 1 signal group, and an element index 1 signal group. The frame index and element index signal groups can be signed values, are required by the sorting mode, and will be described in more detail below. The quantities applied to source address index multiplexer 51 can be thought of as address index modifiers or address offsets. After an access of the direct memory access controller, the new address will be read from the address buffer result unit 59. A SOURCE_ADDRESS_INDEX_MODE control signal and a TELEMENT control signal are applied to the control terminals of the source address index multiplexer 51. The TELEMENT signal indicates that the present element is the last element of series of elements. Based on the control signals applied to the source address index multiplexer 51, one of the signal groups applied to the input terminals is applied the output terminal and become the INDEX_OFFSET signal.

The address mode determination unit 52 has the SOURCE_ADDRESS_INDEX_MODE control signal, the COUNT_MODE control signal, and the DESTINATION_ADDRESS_INDEX_MODE control signal applied to input terminals thereof. These control signals together provide the information as to whether the current addressing mode is a frame mode or a circular buffer mode.

The address multiplexer 53 has the SOURCE_ADRESS address signal group applied to a first input terminal and a NEW_ADDRESS signal group applied to a second input terminal. A control signal is applied to the control terminal of the address multiplexer unit 53. The control signal essentially indicates whether this is the first address to be generated in a sequence. A BUFFER_SIZE signal group is applied to the address buffer mask unit 54. The address buffer mask unit 54 generates a mask based on the size of the buffer.

The output signals of the address mode determination unit 52, the address multiplexer 53 and the address buffer mask unit 54 are applied to the address index unit 55. The address index unit 55 generates an INDEX signal group and a BASE signal group.

The address buffer math unit 56 includes a first adder unit 561, a second adder unit 562, and a third adder unit 563. The output terminal of source address index multiplexer 51, the INDEX_OFFSET signal, is applied to a first input terminal of first adder 561. The second terminal of first adder 561 has the INDEX signal from an output terminal of address index unit 55 applied thereto. The output signal from the first adder unit 561, i.e., a NEW_INDEX signal, is applied to a first input terminal of the second adder unit 562 and to a first input terminal of the third adder unit 563. The ELEMENT_COUNT signal group is applied to a second input terminal of the second adder unit 562 and to a second input terminal of the third adder unit 563. The second adder unit 562 calculates the POSITIVE_WRAP signal that includes the NEW_INDEX value, while the third adder unit 563 calculates the NEGATIVE_WRAP signal that includes the NEW_INDEX value.

The address comparison unit 57 has the INDEX_OFFSET signal from the source address index multiplexer 51, the NEW_INDEX signal from the first adder unit 561, and the POSITIVE_WRAP signal group from the second address unit 562 applied thereto. The address calculation unit 57 generates two control signals and applies these signals to control terminals of a address buffer multiplexer unit 58. These two control signals determine whether the boundaries of the address buffer have been exceeded, and if exceeded, is the buffer wrap positive or negative. The input terminals of the address buffer multiplexer 58 receives a NEW_INDEX signal group from the first adder unit 561, a POSITIVE_WRAP signal from the second adder unit 561, and a NEGATIVE_WRAP signal group from the third adder unit 563. The output signal from the address buffer multiplexer 58 is applied to a first input terminal of address buffer result unit 59, while a second input terminal of the address buffer result unit 59 receives a BASE output signal group from the address index unit 55. The output signal of the address buffer unit 59 is the NEW_ADDRESS signal group.

2. Operation of the Preferred Embodiment

The operation of the present invention can be understood as follows. The signal group in the base address register 61 is loaded into the new address register 67. Because this is the first address, i.e., frame 0, element 0 in FIG. 3, the address is not modified by the address unit 66 and the new address is the base address. The base address is used to access the frame 0, element 0 signal group. The base address is stored in the new address register 67 replacing the base address which was already present. The new address is applied to the second input terminal of the adder unit 66. The activity of the adder unit 66 adds a count to counter unit 64. In response to this count, a control signal from counter 64 is applied to the switch unit 65. This control signal results in the element index signal group from the element index register 63 being transmitted through the switch unit 65 and applied to the first input terminal of adder unit 66. The adder unit 66 combines the signal groups at the two input terminals to for provide a new address. Referring to FIG. 3, the new address is just the address of the frame 0, element 1, i.e., the base address plus the element index. The next iteration provides the frame 0, element 2 address as shown in FIG. 3. The process continues until the new address is the address of the frame 0, element n. At this address, the counter unit has reached the count n. At the count n, the signal group in the frame index register 62 is applied through switch unit 61 to adder unit 66. The addition of the frame index and the new address (i.e., for frame 0, element n) provides the address for frame 0, element 1. The process proceeds until all of the element (signal groups) have been addressed.

As will be clear, the,foregoing discussion is valid when the element index is equal to the number of blocks. When the number of blocks is less than the element index, the addressing unit can operate as above, however, signal groups=0 will be placed in the address entries that are not within the bounds of the transmitted information. In the alternative, the counter unit can be set to a different modulo value and the frame index modified to take account of the fewer number of blocks between the initial block and the final block.

The operation of the preferred embodiment of the addressing unit shown in FIG. 8 is described in co-pending U.S. patent application entitled APPARATUS AND METHOD FOR ADDRESS MODIFICATION IN A DIRECT MEMORY ACCESS CONTROLLER, cited above.

The foregoing description of an address unit having a sorting mode of operations has indicated the relationships of several signal groups. As will be clear, the flow of signal groups will be synchronized with the direct memory access controller clock. This synchronization is not shown, but will be readily implemented by those familiar with the design of digital processing units.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A digital processing unit comprising:

a core processing unit;

at least one serial port;

at least one memory unit; and a direct memory access unit controlling the transfer of signal groups between the core processing unit, the serial port, and the memory unit; wherein the direct memory access unit includes an addressing unit for sorting signal group from a time-division multiplexed series of signals, wherein the addressing unit generates a plurality of index values and selects one of the index values to be combined with the base address, wherein the addressing unit includes;

an adder unit for providing next new address;

a new address storage unit, the new address storage unit having a base address applied thereto;

an element index storage unit;

a frame index storage unit;

a switch unit, the switch unit having a signal group stored in the element index storage unit applied to one terminal thereof, the switch unit having a signal group stored in the frame index storage unit applied to a second terminal thereof, the switch unit selectively applying an index offset value selected from one of the element index storage unit signal group and the frame index storage signal group to a terminal of the adder unit in response to a control signal:

an index unit responsive to the new address, the index unit generating an index value;

a math unit responsive to the index offset value and the index value for generating a plurality of possible result index values; and a selection unit responsive to the plurality of possible result index values and the index offset value, the selection unit applying a selected result index value to the new address storage unit.

2. The digital signal processing unit as recited in claim 1 wherein the time-division multiplexed signals have a T1 or a E1 protocol.

3. The digital signal processing unit as recited in claim 1 wherein the addressing unit provides addresses for time-division multiplexed signals and for a circular buffer storage unit.

4. The digital signal processing unit as recited in claim 1 wherein the signal group stored in the element index storage unit is equal to the number of signal groups in a block of signal groups.

5. The digital processing unit as recited in claim 1 wherein the addressing unit generates the addresses for formatting blocks of signal groups into frames of signal groups.

6. A method of sorting the addresses of signal group elements arranged in blocks having a time-division multiplexed protocol into frames of signal group elements, the method comprising:

generating an address for the first element in each block of elements, of each block in sequence;

generating an address for the next sequential element in each block of elements in sequence, wherein said generating an address for the next sequential element includes:

generating a plurality of index values;

selecting one of the index values; and combining the one index value with the address for the first element to form a new address; and when all elements have not been addressed at the end of the generating an address for the next sequential element, repeating the generating an address for the next sequential element in each block of elements in sequence.

7. The method as recited in claim 6 further comprising, when all of the elements have been addressed at the end of the generating an address for the next sequential element, ending the sorting of the addresses.

8. The method as recited in claim 6 wherein each generating an address step provides an address of the addresses for a frame of signal group elements.

9. The method as recited in claim 6 wherein each generating step involves addressing an element of the elements separated by the number of elements in a block.

10. The method as recited in claim 6 wherein the last element in a frame has an address separated from the first address in the next consecutive frame by {(the number of frames minus one) times the number of elements per frame} minus 1.

11. An apparatus for addressing signal group elements in a time-division multiplexed block format in the order of frame format, the apparatus comprising:

a new address storage unit, the new address storage unit storing a new address value, the new address storage unit having a base address applied thereto;

a frame index storage unit; the frame index storage unit storing a frame index value;

an element index storage unit, the element index storage unit storing an element index value;

a switch unit subject to a control signal, the switch unit having the element index value applied to a first input terminal, the switch unit having the frame index value applied to a second input terminal; the control signal determining an index offset value applied to the output terminal of the switch unit;

an index unit responsive to the new address value, the index unit generating an index value, a math unit responsive to the index offset value and the index value for generating a plurality of possible result index values; and, a selection unit responsive to the plurality of possible result index values and the index offset value, the selection unit applying a selected result index value to the new address storage unit.

12. The apparatus as recited in claim 11 wherein the element index value is the number of signal group elements in each block of time-division multiplexed format.

13. The apparatus as recited in claim 12 wherein the frame index value is one less than the product of the element index value with one less than the number of blocks.

14. The apparatus as recited in claim 11 wherein each of the additions of the element index value to the new address provides an address for an element from the same frame.

15. The apparatus as recited in claim 11 wherein, when the new address addresses an element having a position in the last block, the addition of the frame index value and a new address provides the address of the element having the next position in the first element block.

* * * * *